United States Patent
Vaidyanathan et al.

[11] Patent Number: 5,909,866
[45] Date of Patent: Jun. 8, 1999

[54] TRANSMISSION ASSEMBLY FOR VEHICLE SEAT ADJUSTER WITH MECHANICAL BRAKE TO PREVENT BACK DRIVING

[75] Inventors: Sriam Vaidyanathan, Novi; Christopher Kanuit, Battle Creek; Slavko Kocecski, Sterling Heights, all of Mich.; Sushil Shastry, Toledo, Ohio

[73] Assignee: Hoover Universal, Inc., Plymouth, Mich.

[21] Appl. No.: 08/880,593

[22] Filed: Jun. 23, 1997

[51] Int. Cl.⁶ ............................................. F16M 13/00
[52] U.S. Cl. .................................... 248/429; 248/419
[58] Field of Search ............................ 248/429, 419, 248/422, 420, 421; 297/344.13, 362.14

[56] References Cited

U.S. PATENT DOCUMENTS

| | | | |
|---|---|---|---|
| 3,692,272 | 9/1972 | Radke | 248/429 |
| 4,173,376 | 11/1979 | Standing et al. | 384/517 |
| 4,727,762 | 3/1988 | Hayashi | 74/89.15 |
| 4,799,734 | 1/1989 | Periou | 297/362.14 |
| 4,838,511 | 6/1989 | Terada et al. | 248/429 |
| 5,337,995 | 8/1994 | Satoh et al. | 248/429 |
| 5,349,878 | 9/1994 | White et al. | 74/89.14 |
| 5,467,957 | 11/1995 | Gauger | 248/429 |
| 5,516,071 | 5/1996 | Miyauchi | 248/429 |
| 5,707,035 | 1/1998 | Kargol et al. | 248/429 |
| 5,727,768 | 3/1998 | Sakamoto | 248/429 |
| 5,738,327 | 4/1998 | Tanaka et al. | 248/419 |

Primary Examiner—Ramon O. Ramirez
Assistant Examiner—Anita M. King
Attorney, Agent, or Firm—Harness, Dickey & Pierce, P.L.C.

[57] ABSTRACT

A transmission assembly for use in a power seat adjuster. A mechanical brake in the form of a coned-disk spring is included in the transmission to prevent back driving of the transmission by application of a force to the seat assembly which could otherwise produce unintended movement of a seat within a vehicle body.

9 Claims, 1 Drawing Sheet

TRANSMISSION ASSEMBLY FOR VEHICLE SEAT ADJUSTER WITH MECHANICAL BRAKE TO PREVENT BACK DRIVING

BACKGROUND AND SUMMARY OF THE INVENTION

The present invention relates to a transmission assembly with a mechanical brake to prevent back driving and in particular to a transmission assembly for use in a power driven vehicle seat assembly wherein the brake prevents unintended movement of the seat due to back driving of the transmission assembly caused by application of forces to the seat assembly.

Vehicle seat assemblies are typically provided with a horizontal adjuster to enable fore and aft adjustment of the seat position relative to the vehicle body. Many seat assemblies have a motor driven power adjustment mechanism which moves the seat fore or aft upon actuation of a control switch. A power seat adjuster typically includes an elongated lead screw, or threaded shaft, rotatably attached to the moving part of the seat assembly. A nut, having a threaded bore, is attached to the lower, fixed portion, of the seat assembly with the lead screw threaded therethrough. An electric motor has an output shaft that is coupled to the lead screw through a transmission assembly. Upon actuation of the motor, the lead screw is rotated, causing the lead screw to move axially through the nut, changing the position of the movable portion of the seat assembly.

In a power adjustment mechanism, it is desirable to minimize noise and vibration produced during seat adjustment. One way to reduce noise and vibration is to reduce the amount of friction between the moving components of the adjustment mechanism. By reducing friction, less force is required to move the seat assembly, thus less noise and vibration is produced. Furthermore, smaller and lighter weight components can be used. However, friction and inefficient gearing within the drive mechanism has a positive benefit of preventing back driving, i.e. unintended rotation of the lead screw caused by forces applied to the seat assembly. If the amount of friction in the drive mechanism is sufficiently reduced, it may be possible to back drive the adjustment mechanism by applying a load to the seat, causing the lead screw to rotate. The result is unintended movement of the seat relative to the vehicle body.

The present invention provides a brake within the transmission assembly to prevent rotation of the lead screw when a large force is applied to the seat assembly. The brake is only operated as a result of a high load applied to the seat assembly. During normal seat operation, the brake is not applied and the drive mechanism has the benefit of the low friction.

The transmission assembly of the present invention utilizes a coned-disk spring, such as a belleville washer, disposed between a radial shoulder formed by the lead screw and a radial shoulder formed by the transmission housing. The spring is frusto conical in shape in its normal state. When a load is applied to the seat causing movement of the transmission housing relative to the screw in the proper direction, the shoulder on the screw moves toward the housing shoulder. The coned-disk spring is flattened therebetween causing the spring to tightly grip the lead screw. Simultaneously, the outside diameter of the spring bears outwardly against the transmission housing. The result is a locking of the screw to the housing, thereby preventing rotation of the lead screw and back driving of the adjustment mechanism.

The transmission housing and lead screw are designed to slightly compress the coned-disk spring within its elastic range to put a pre-load on the spring and to bias the lead screw against a thrust bearing support in the transmission housing.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
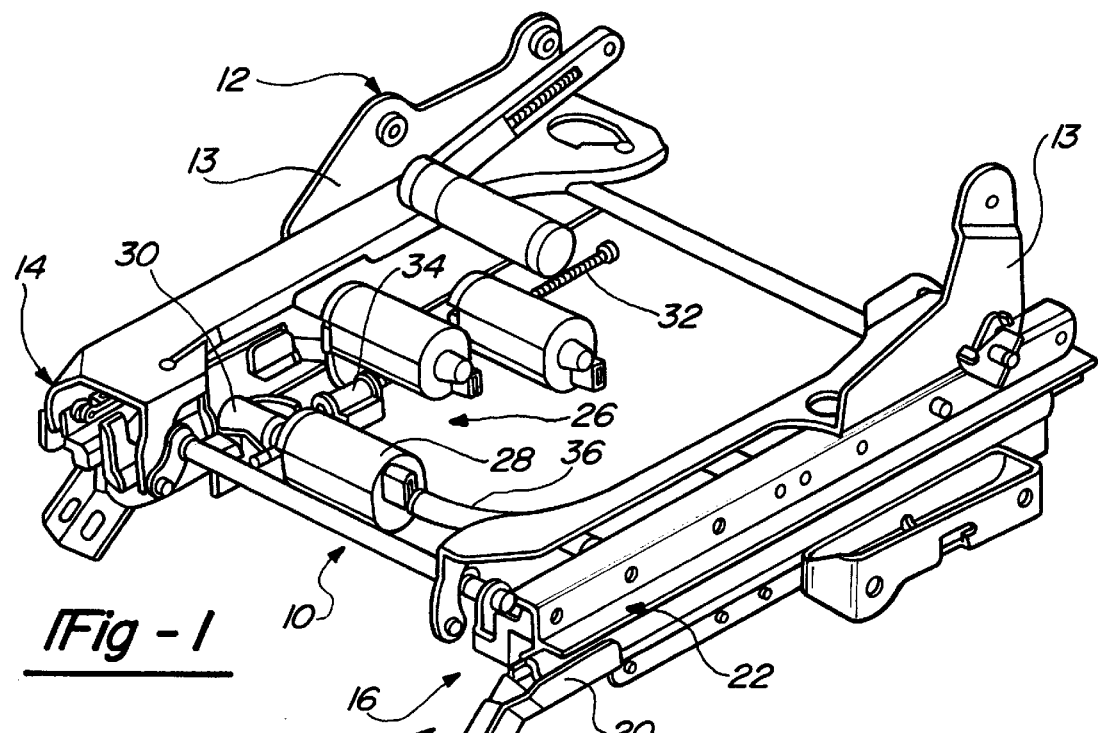
FIG. 1 is a perspective view of the lower frame portion of a vehicle seat assembly with a power drive adjustment mechanism.

With reference to FIG. 1, a seat adjuster for a vehicle seat assembly having a transmission assembly of the present invention is shown designated generally at 10. The seat adjuster 10 is associated with a vehicle seat assembly having a seat portion and a reclineable seat back. The seat portion and seat back are not shown, but are conventional within the vehicle seating art. The seat adjuster includes an upper frame sub-assembly 12 which is mounted on an outboard track sub-assembly 14 and an inboard track sub-assembly 16. The upper frame sub-assembly 12 includes mounting brackets 13 to which the seat portion and seat back of the vehicle seat assembly are attached.

The inboard and outboard track sub-assemblies each include a lower track 20 that is adapted to be mounted on the floor of the vehicle body and secured thereto. The track sub-assemblies each further include an upper track 22 that is supported on the lower track and movable relative to the lower track in the fore and aft directions as shown by the arrow 24. Horizontal movement is facilitated by a sliding interface between the upper and lower tracks which includes one or more bearings interposed therebetween in a well known fashion for vehicle seat assemblies. The particular configuration of the upper and lower tracks and the bearing assembly is not a part of the present invention.

A horizontal drive mechanism 26 is provided to move the upper tracks 22 relative to their respective lower tracks 20 to adjust the fore and aft position of the seat assembly within the vehicle body. In addition to adjusting the position, the horizontal drive mechanism also functions to hold the upper tracks in their adjusted positions. The horizontal drive mechanism includes a drive motor 28, a transmission assembly 30, a lead screw 32 and a horizontal drive nut 34 on the outboard track sub-assembly 14.

On the inboard track sub-assembly 16, the drive mechanism includes a second lead screw, drive nut and transmission assembly (not shown). The inboard side transmission assembly is coupled to the drive motor 28 by a flexible drive shaft 36. The drive motor 28 is oriented 90° relative to the two lead screws and the drive motor is coupled to the lead screws by the transmission units.

Typically, the drive motor, transmission assemblies and lead screws are attached to the upper tracks while the drive nuts are attached to the lower tracks. Upon actuation of the drive motor 28, the lead screws are rotated, causing the positions of the lead screws to move axially relative to the nuts to move the upper tracks, seat cushion and seat back.

Figure 2:
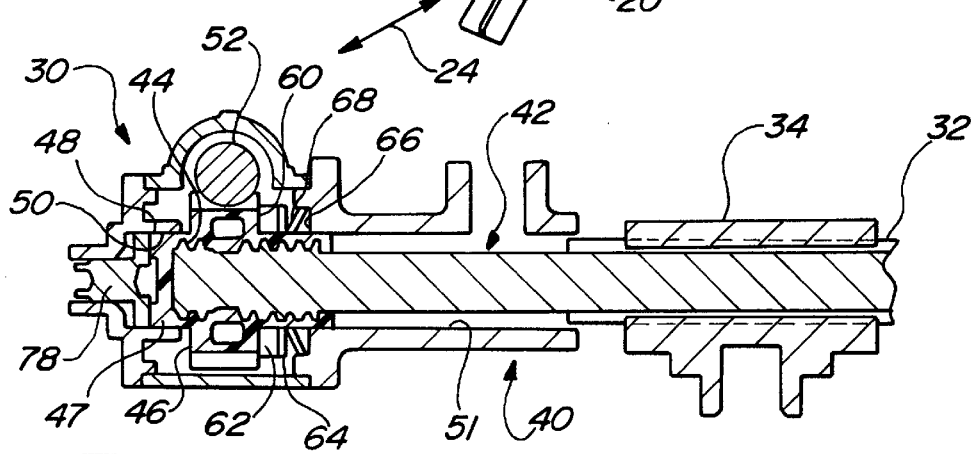
FIG. 2 is a vertical sectional view of the transmission assembly.

With reference to FIG. 2, the transmission assembly 30 is shown in greater detail. The transmission assembly 30 includes a housing 40 which receives a portion 42 of the lead screw 32. Screw end portion 44 is knurled or otherwise formed with grooves. A worm gear 46 is secured to the knurled end portion 44. The worm gear has an axially extending hub 47 with an outer cylindrical surface 48. The hub engages the inner cylindrical surface 50 of the housing bore 51 to provide radial bearing support for the lead screw within the housing. A worm 52 meshes with the worm gear and is driven by the drive motor 28 to rotate the worm gear and the lead screw 32. The worm gear has a larger diameter than the hub 47 forming a radially extending shoulder 60. In a preferred embodiment, a Delrin bushing 62 is placed next to the shoulder 60 and a flat washer 64 placed against the bushing 62.

The transmission housing 40 forms a radial shoulder 66 which is spaced from and opposes the radial shoulder 60 of the worm gear and the flat washer 64. A coned-disk spring such as belleville washer 68 is disposed between the flat washer 64 and the radial shoulder 66 of the transmission housing. The belleville washer surrounds the hub 47 of the worm gear. The bore 70 is larger than the bore 50 supporting the worm gear hub. The outer edge 74 of the belleville washer engages a chamfer 72 formed at the intersection of the bore 50 and the radial shoulder 66. The chamfer 72 provides a flat surface for surface-to-surface engagement with the flat outer edge 74 of the belleville washer.

A set screw 78 is threaded into the end of the housing 40 and engages the end of the worm gear to provide axial thrust support in one direction. The set screw is positioned so as to put a predetermined pre-load on the belleville washer 68. The belleville washer 68 thus provides axial thrust support in the other axial direction. An advantage of using a coned-disk spring in the transmission assembly is that the set screw can now be adjusted over a larger range of positions while maintaining the proper axial pre-load on the worm gear. Without the coned-disk spring, the flat washer 64 would engage a radial shoulder of the transmission housing. This resulted in a very narrow rotational range for the set screw to produce the desired axial pre-load on the worm gear. With the use of a coned-disk spring, it may be possible to eliminate the set screw 78 and construct the housing and worm gear such that the desired pre-load results within the normal tolerance range for the power drive components.

During normal operation, the belleville washer does not produce significant friction in the transmission assembly. However, in the event a significant load is applied to the seat, tending to urge the housing 40 to the left as viewed in FIG. 2, the belleville washer 68 will be deflected from its frusto conical shape to a flattened shape. The deflection of the washer will cause a decrease in the washer inside diameter, causing the washer to bear firmly against the cylindrical hub of the worm gear. This dramatically increases the friction between the housing and the lead screw to the extent that the lead screw will not turn relative to the housing, thus preventing back driving of the transmission by rotation of the lead screw. The deflection of the belleville washer sufficient to lock the lead screw is typically permanent, thus necessitating replacement of the transmission assembly once a locking load has been encountered.

Figure 3:
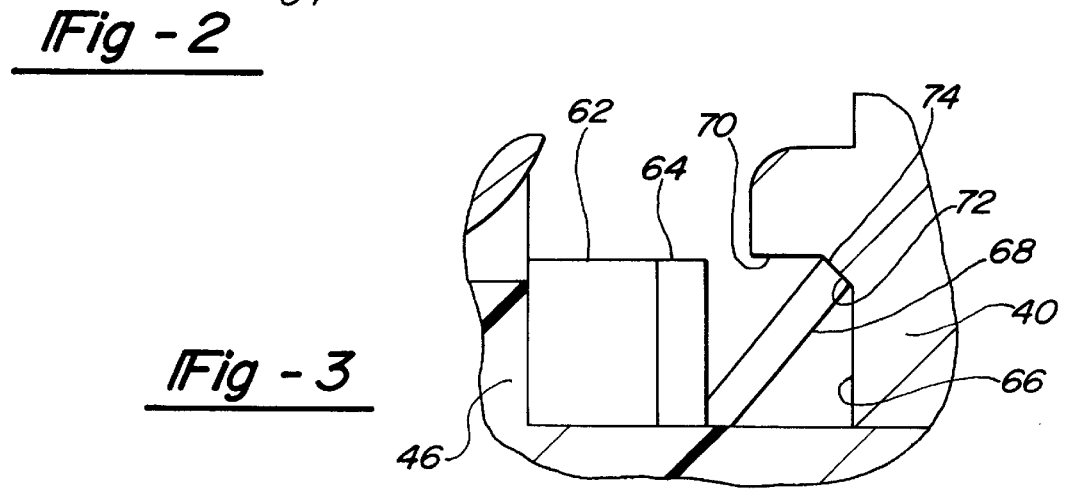
FIG. 3 is enlarged fragmentary view of the transmission housing illustrating the coned-disk spring forming the brake.

The washer 68 shown in FIGS. 2 and 3 is useful to brake the transmission when a load is applied to the seat which urges the housing to the left as viewed in FIG. 2. If braking action is desired in the other direction, another coned-disk spring can be placed on the opposable side of the worm gear such that it is collapsed when the housing is moved to the right.

One or both of the inboard and outboard transmission assemblies are provided with the coned-disk spring brake. Some power seat adjusters are driven on only one side of the seat. These may also have the brake included in the transmission assembly. However, single side drive mechanisms typically experience sufficient twisting when the seat is loaded to increase friction enough to prevent back driving without a brake.

The transmission assembly of the present invention provides a low cost and simple mechanism to brake the transmission to prevent back driving in high loading conditions without adding friction to the drive system. The result is a low friction, reduced noise and vibration, power drive for the seat adjuster without back driving.

It is to be understood that the invention is not limited to the exact construction illustrated and described above, but that various changes and modifications may be made without departing from the spirit and scope of the invention as defined in the following claims.

We claim:
1. A vehicle seat assembly comprising:
 a fixed track adapted to be attached to a vehicle body;
 a slide track mounted to the fixed track and movable thereon to a plurality of positions relative to the fixed track;
 a nut mounted to one of the fixed and slide tracks, the nut having a threaded bore therethrough;
 an elongated threaded lead screw threaded through the bore of the nut and mounted to the other of the fixed and slide tracks, the lead screw being rotatable about a lead screw axis whereby the nut is movable along the length of the lead screw;
 the other of the fixed and slide tracks having a housing into which the lead screw extends to mount the lead screw thereto;
 motor means having an output shaft operatively coupled to the lead screw to rotate the lead screw upon operation of the motor; and
 a brake for preventing rotation of the lead screw when the housing is moved relative to the lead screw in a predetermined axial direction.

2. The vehicle seat assembly of claim 1 wherein the brake includes a coned-disk spring surrounding the lead screw and disposed between axially opposed radial shoulders formed by the housing and the lead screw, the coned-disk spring being deflected upon movement of the housing radial shoulder toward the lead screw radial shoulder causing the coned-disk spring to tightly engage the lead screw and housing.

3. The vehicle seat assembly of claim 2 further comprising a chamfer between the housing radial shoulder and an adjacent inner cylindrical surface of the housing against which an outer radial surface of the coned-disk spring engages when the housing shoulder is moved toward the lead screw shoulder.

4. The vehicle seat assembly of claim 2 wherein the coned-disk spring is pressed between the housing and lead screw shoulders to produce a pre-load on the spring and to bias the lead screw against an axial thrust bearing.

5. The vehicle seat assembly of claim 4 wherein the axial thrust bearing is formed by a set screw threaded into the housing and bears against an end of the lead screw.

6. The vehicle seat assembly of claim 5 wherein the set screw is rotatable relative to the housing to press the lead screw shoulder toward the coned-disk spring to vary the pre-load in the spring.

7. The vehicle seat assembly of claim 2 wherein the coned-disk spring is a belleville washer.

8. The vehicle seat assembly of claim 1 further comprising a pair of fixed and slide tracks and a pair of lead screws, nuts and housings with the brake associated with each of the lead screws and housings for preventing rotation of each of the lead screws.

9. The vehicle seat assembly of claim 1 wherein the nut is attached to the fixed track while the lead screw and housing are mounted to the slide track.

* * * * *

UNITED STATES PATENT AND TRADEMARK OFFICE
CERTIFICATE OF CORRECTION

PATENT NO. : 5,909,866

DATED : June 8, 1999

INVENTOR(S) : Sriram Vaidyanathan, Christopher Kaniut, Slavko Kocevski, Sushil Shastry It is certified that error appears in the above-indentified patent and that said Letters Patent is hereby corrected as shown below:

On the title page, item [75] Inventors;

"Sriam" should be --Sriram--
"Kanuit" should be --Kaniut--
"Kocecski" should be --Kocevski--

Signed and Sealed this

Twenty-third Day of November, 1999

Attest:

Q. TODD DICKINSON

*Attesting Officer*       *Acting Commissioner of Patents and Trademarks*